United States Patent
Foltin

(10) Patent No.: US 9,505,340 B2
(45) Date of Patent: Nov. 29, 2016

(54) METHOD AND EVALUATION AND CONTROL UNIT FOR ADAPTING A HEADLIGHT BEAM BOUNDARY OF A LIGHT CONE

(71) Applicant: Robert Bosch GmbH, Stuttgart (DE)

(72) Inventor: Johannes Foltin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/423,970

(22) PCT Filed: Aug. 26, 2013

(86) PCT No.: PCT/EP2013/067638
§ 371 (c)(1),
(2) Date: Feb. 25, 2015

(87) PCT Pub. No.: WO2014/040849
PCT Pub. Date: Mar. 20, 2014

(65) Prior Publication Data
US 2015/0239391 A1    Aug. 27, 2015

(30) Foreign Application Priority Data
Sep. 11, 2012  (DE) ............ 10 2012 216 088

(51) Int. Cl.
*B60Q 1/12*  (2006.01)
*B60Q 1/08*  (2006.01)
(Continued)

(52) U.S. Cl.
CPC ............. *B60Q 1/085* (2013.01); *B60Q 1/115* (2013.01); *G01B 11/303* (2013.01); *G06K 9/00798* (2013.01); *B60Q 2300/112* (2013.01); *B60Q 2300/132* (2013.01); *B60Q 2300/32* (2013.01)

(58) Field of Classification Search
CPC .... G06K 9/00798; B60Q 1/085; B60Q 1/12; B60Q 1/115; G08G 1/127; G01M 11/064; F21S 48/1388
USPC ............ 701/49; 362/37, 466, 549, 517; 340/905; 356/121
See application file for complete search history.

(56) References Cited

U.S. PATENT DOCUMENTS 5,164,785 A * 11/1992 Hopkins ............ G01M 11/064
                                                                  356/121
5,868,488 A *  2/1999 Speak .................... B60Q 1/12
                                                                  362/37
(Continued)

FOREIGN PATENT DOCUMENTS

DE        42 35 104       4/1994
DE    10 2007 022524    11/2008
(Continued)

OTHER PUBLICATIONS

International Search Report for PCT/EP2013/067638, dated Jan. 8, 2014.

*Primary Examiner* — Yuri Kan
(74) *Attorney, Agent, or Firm* — Norton Rose Fulbright US LLP; Gerard Messina

(57) ABSTRACT

A method for adapting a headlight beam boundary of a light cone of at least one headlight of a vehicle includes the following steps: detecting at least one area of a roadway, the area being situated in the travel direction of the vehicle; determining a topography of the at least one area of the roadway; and providing a control signal for adapting the headlight beam boundary as a function of the topography.

12 Claims, 3 Drawing Sheets

(51) Int. Cl.
*B60Q 1/115* (2006.01)
*G01B 11/30* (2006.01)
*G06K 9/00* (2006.01)

(56) References Cited

U.S. PATENT DOCUMENTS

| | | | | |
|---|---|---|---|---|
| 7,708,434 | B2* | 5/2010 | Moizard | B60Q 1/085 |
| | | | | 362/464 |
| 2005/0174796 | A1* | 8/2005 | Pfister | B60Q 1/12 |
| | | | | 362/549 |
| 2005/0270792 | A1* | 12/2005 | Suzuki | F21S 48/1388 |
| | | | | 362/517 |
| 2007/0230199 | A1* | 10/2007 | Eberhardt | B60Q 1/085 |
| | | | | 362/466 |
| 2009/0160675 | A1* | 6/2009 | Piccinini | G08G 1/127 |
| | | | | 340/905 |
| 2015/0051797 | A1* | 2/2015 | Ehlgen | B60Q 1/115 |
| | | | | 701/49 |
| 2015/0151669 | A1* | 6/2015 | Meisner | B60Q 1/085 |
| | | | | 701/49 |

FOREIGN PATENT DOCUMENTS

| | | |
|---|---|---|
| DE | 10 2010 044263 | 3/2012 |
| EP | 0 823 351 | 2/1998 |
| EP | 1 088 700 | 4/2001 |
| EP | 1 873 736 | 1/2008 |
| EP | 2 154 025 | 2/2010 |
| EP | 2 119 592 | 6/2010 |
| FR | 2 927 857 | 8/2009 |

\* cited by examiner

METHOD AND EVALUATION AND CONTROL UNIT FOR ADAPTING A HEADLIGHT BEAM BOUNDARY OF A LIGHT CONE

BACKGROUND OF THE INVENTION

1. Field of the Invention

The present invention relates to a method for adapting a headlight beam boundary of a light cone of at least one headlight of a vehicle. Moreover, the present invention relates to an evaluation and control unit for adapting a headlight beam boundary of a light cone of at least one headlight of a vehicle. Lastly, the present invention relates to a corresponding computer program product.

2. Description of the Related Art

Conventional headlight leveling control of a headlight of a vehicle allows vertical swiveling of at least one beam-forming portion of the headlight or of a light source of the headlight in order to adapt a light cone (the headlight light cone) to a load situation of the vehicle.

Automatic headlight leveling control may recognize a suspension state and load state of the vehicle via at least one chassis sensor. For example, the automatic headlight leveling control may compensate for pitching motions of the vehicle caused by acceleration forces such as stopping or braking, so that the light cone maintains a preset illumination range relative to the vehicle despite the pitching motion of the vehicle.

Published European patent application document EP 2 119 592 A1 describes a control unit for controlling a light distribution and a horizontal light-dark cutoff of headlights of a motor vehicle, which includes a signal processing means for generating control signals for the main headlights.

BRIEF SUMMARY OF THE INVENTION

Against this background, a method of the type mentioned at the outset is provided which includes the following steps: detecting at least one area of a roadway, the area being situated in the travel direction, determining a topography of the at least one area of the roadway, and providing a control signal for adapting the headlight beam boundary as a function of the topography.

Moreover, against this background an evaluation and control unit of the type mentioned at the outset is provided which includes a detection unit for detecting at least one area of a roadway, the area being situated in the travel direction of the vehicle, a unit for determining a topography of the at least one area of the roadway, and a unit for providing a control signal for adapting the headlight beam boundary as a function of the topography.

Lastly, against this background a computer program product is provided which includes program code for carrying out a method for adapting a headlight beam boundary of a light cone of at least one headlight of a vehicle of the above-mentioned type when the program is executed on an evaluation and control unit.

The present invention is based on the concept that an orientation of the headlight beam boundary, in particular of a front headlight, relative to the vehicle may be predictively regulated as a function of the topography of the roadway. As a result, the distance from the headlight beam boundary may be tracked during operation of the vehicle. The headlight beam boundary is understood to mean a transition from an illuminated area into an unilluminated area. The headlight beam boundary is usually oriented in parallel to the transverse axis of the vehicle. In addition, the headlight beam boundary is typically identifiable as a light-dark cutoff. This light-dark cutoff, viewed in the travel direction, is preferably a transition from the illuminated area to the unilluminated area. Thus, this is an upper headlight beam boundary.

The upper headlight beam boundary is preferably set in such a way that the headlight beam boundary, viewed in the travel direction, is situated as far away from the vehicle as possible. A roadway area which is illuminated to the greatest extent possible is thus provided to a driver of the vehicle. At the same time, the upper headlight beam boundary must be situated close enough to the vehicle that blinding of drivers traveling ahead or oncoming drivers is prevented.

To ensure that the largest possible area is illuminated, and at the same time to prevent blinding of other drivers, it is now provided that the headlight beam boundary is to be shifted closer to the vehicle when pitching motions of the vehicle are to be expected due to the roadway topography. This is based on the finding that blinding must be prevented for safety reasons, even during pitching motions. Shifting the headlight beam boundary thus results in a safety angle between an upper boundary of the light cone for a headlight boundary situated at a maximum distance away and the upper boundary of the light cone for an instantaneous headlight beam boundary. The headlight beam boundary is preferably set via the safety angle of the headlight. The safety angle also indicates the angle about which the vehicle is able to undergo an upward pitching motion in the front end area without another vehicle on a flat roadway being blinded.

The safety angle is thus a well-definable measure for an orientation of the light cone. The safety angle is particularly suited as a control variable for adapting the headlight beam boundary relative to the vehicle. Based on the safety angle, the motor vehicle may now undergo a pitching motion, which rotates the headlight around the safety angle about a transverse axis, without blinding of other drivers occurring.

It is particularly preferred when the pitching motion is at least quantitatively predicted as a function of the topography. This results in the option for a differentiated anticipatory adaptation of the safety angle, and thus of the headlight beam boundary. The risk of blinding other road users is thus low or completely eliminated due to the anticipatory response. At the same time, the average safety angle may be kept preferably small, and therefore the visual range may be kept particularly large.

The light cone describes the spatial area in which the headlight essentially emits light. The light cone does not necessarily have to be conical, and instead may have some other spatial geometry.

The topography is understood in particular to mean a variation in height of the roadway which may bring about a pitching motion of the vehicle. Such variations in height are caused by damage to the roadway surface and/or roadway repair sites, for example.

The control signal is preferably used to control an actuator which is able to change the relative orientation of the light cone with respect to the motor vehicle.

In addition, it is conceivable to additionally provide the control signal as a function of a pitching motion of the vehicle. The adaptation of the headlight beam boundary may thus be further improved and/or verified.

In one embodiment of the present invention, the control signal is provided as a function of a speed of the vehicle.

In this embodiment, in addition to the topography of the area of the roadway, the speed of the vehicle is also taken into account for the control signal. Since the area of the roadway is situated ahead of the motor vehicle in the travel direction, the effect of this area and in particular its topography on the vehicle has a time delay. It may now be ascertained, as a function of the distance from the area of the roadway to the vehicle and the speed of the vehicle, when the topography, which is already determined, causes a pitching motion of the vehicle. The headlight beam boundary may thus be regulated very accurately as a function of the speed.

In another embodiment, the at least one area of the roadway is detected with the aid of an optical sensor, the topography being determined as a function of measured values of the optical sensor.

In this embodiment, the area of the roadway is optically sensed. It is advantageous here that optical sensors are economical to manufacture and at the same time have a relatively large sensor range. It is also advantageous that many different roadway surfaces may be recognized and taken into account. In addition, together with headlights of the vehicle it may be ensured that the area of the roadway to be detected is sufficiently illuminated. Overall, accurate and robust measurements in various driving situations are thus possible.

Cameras, in particular matrix cameras, which are preferably designed as video cameras are particularly suited as optical sensors. Alternatively or additionally, it is conceivable to use photocells and/or infrared-sensitive imaging sensors as optical sensors.

In another embodiment, a matrix camera which is able to generate at least one image as the measured value is used as the optical sensor, the method including the following additional steps: determining at least one topographic feature as a function of the at least one image, and determining the topography as a function of the at least one topographic feature.

In this embodiment, the topography of the area of the roadway is determined from the image. For this purpose, at least one topographic feature is determined as a function of the image.

The topography of the area of the roadway is typically a function of damage to the roadway surface and/or repair sites. Repair sites which are limited to a portion of a lane result in particularly great topographic changes. In contrast, a site where repairs have been carried out over an entire lane width typically has a topographically critical location at the beginning of the repair site and another topographically critical location at the end, viewed in the travel direction.

In addition, it is advantageous to ascertain whether the repair site is limited to a portion of the lane or extends over the entire lane width. The more repair sites that are detected in the area, the greater the topographic changes to be suspected in this area. Thus, from the number and/or extent of the repair sites, a conclusion may be drawn concerning the magnitude of the pitching motions to be expected in this area, and thus, how the headlight beam boundary is to be shifted. Alternatively or additionally, the headlight beam boundary may be regulated as a function of the change in the roadway. For example, a reduction in the pitching motions may be assumed when the number of repair sites in the detected area decreases. Conversely, an increase in the pitching motions may be assumed when the number of repair sites in the detected area increases. The headlight beam boundary may thus be regulated, for example, by an absolute measure, such as the number of repair sites, or by a relative measure, such as the change in the number of repair sites.

For example, a texture of the area of the roadway may be analyzed as a topographic feature. Based on the analysis of the textures, it is possible to ascertain whether repair sites are present in the area, since in terms of structure and/or color they are different from an undamaged roadway.

As an alternative or additional topographic feature, it is conceivable to determine a density of an optical flow in the area. The density of the optical flow is greater at edges of the roadway, which occur at repair sites, for example, than for homogeneous roadway surfaces. Thus, the headlight beam boundary may be shifted closer to the vehicle as a function of the optical flow when the optical flow is more dense, and vice versa.

As an alternative or additional topographic feature, it is conceivable to evaluate a color of the roadway. For a very dark color of the roadway, it may be assumed that the pavement is new. On this basis it may in turn be concluded that changes in the topography will be only minor. Consequently, the headlight beam boundary may be shifted away from the vehicle. If the color of the roadway is relatively light and/or evened out, this indicates aged pavement, on which many topographic changes are to be expected. Thus, in this case the headlight beam boundary is preferably to be shifted toward the vehicle, thus increasing the safety angle.

As an alternative or additional topographic feature, a quality of a roadway marking may be used. In this regard, similarly as for the roadway, aged pavement and thus major topographic changes is/are to be assumed when the roadway marking is not clearly recognizable, for example due to wear and/or soiling. Conversely, a clearly recognizable roadway marking with high contrast indicates new pavement, and thus, few topographic changes in the area of the roadway. The headlight beam boundary is thus preferably shifted closer to the vehicle when a faint roadway marking is detected. Conversely, the headlight beam boundary is preferably shifted away from the vehicle when the roadway marking may be recognized well and/or with high contrast.

A combination of two or more different topographic features is particularly advantageous, so that even greater robustness of the method is ensured. In addition, indications of topographic changes may be validated, so that faulty regulation of the headlight beam boundary is further prevented.

In another embodiment, at least one gradient in the at least one image is determined as the topographic feature.

In this embodiment, at least one gradient from the image is used as the topographic feature. It is particularly advantageous when "horizontal" gradients are evaluated. Horizontal gradients are understood to mean gradients which describe a change in the image information in the travel direction, and which are thus situated in the image transversely, in particular orthogonally, with respect to the travel direction. At the same time, it is preferred when the gradients in the image are situated in a roadway plane.

For evaluation of the topographic features, it is preferred to evaluate the number of different gradients and/or the intensity of the gradients. It is particularly advantageous to evaluate the number of gradients which is above a predefined threshold value. This may involve an absolute number of gradients in the area, or a relative density of gradients in the area. The advantage of the relative density is that the size of the area may be dynamically manipulated while maintaining the control quality of the method. It is also advantageous when the change in the topographic features over multiple chronologically successive areas is used for adapting the headlight beam boundary. Thus, it is also not necessary to determine an absolute headlight beam boundary. The headlight beam boundary may then be shifted farther away from the vehicle when it is to be presumed that the roadway quality is increasing, for example due to a reduction in the number and/or of the density of the gradients. A shift of the headlight beam boundary toward the vehicle may take place for a correspondingly reversed change in the topographic features over multiple chronologically successive areas. The property of the roadway of inducing the pitching motions of the vehicle from the roadway surface is referred to here as roadway quality. The roadway quality thus increases when it induces a lesser pitching motion of the vehicle.

As described above, topographic changes are frequently caused by repair sites. These repair sites usually have a darker color than the older roadway surface surrounding the repair site.

The different coloring and/or materials result(s) in gradients which are well detectable from the image. A high roadway quality may thus be assumed in particular when few gradients and/or gradients having a low value are detected. A low roadway quality may be assumed when there is a large number of gradients and/or a high value of the gradients. With regard to the value of the gradients, it is also conceivable to assume an average value which is determined over the entire area of the roadway. In the simplest case, a small safety angle is set when there are few gradients, and a large safety angle is set when the gradients are large.

It is particularly preferred when, for determining the gradients, portions of the area of the roadway are omitted in which roadway markings are ascertained, since these may make the determination of the topography more difficult and may skew the determination. In addition, at intersections and/or turn lanes, for example, the number of gradients could greatly increase due to the large number of roadway markings, without to the topography of the roadway necessarily changing.

This results in a method in which the headlight beam boundary and thus the safety angle are anticipatorily adapted when the number and/or the value of the gradients in the area of the roadway change(s). For example, the safety angle is decreased when the number of gradients in the area of the roadway decreases over time. If the number of gradients in the area of the roadway increases over time, the safety angle is preferably increased. The change in the number and/or values of the gradients may thus be used for this purpose in order to assess the homogeneity of the roadway. It is thus possible to make a relative adaptation of the instantaneously set headlight beam boundary, and to set the new headlight beam boundary as a function of an instantaneous headlight beam boundary.

Overall, this results in a particularly simple and robust method for adapting the headlight beam boundary.

In another embodiment, the following additional steps are provided: storing first topographic features at a certain geographical location, determining a pitching motion of the vehicle at the certain geographical location, ascertaining a setpoint beam boundary as a function of the pitching motion, and associating the setpoint beam boundary with the first topographic features.

In this embodiment, an additional control loop is provided which continuously adapts a setpoint beam boundary. In other words, the setpoint beam boundary is adapted during operation of the vehicle and thus "learned." The setpoint beam boundary is preferably the setpoint value to which the headlight beam boundary and/or the safety angle is/are to be set.

To achieve the adaptation, the area of the roadway is initially detected at the geographical location, and its topographic features are stored. As soon as the vehicle has reached this geographical location and undergone the pitching motions caused by the location, the actual required orientation of the headlight and thus of the headlight beam boundary or of the safety angle may be determined. In addition, the configuration of the topographic features which has been ascertained at the geographical location may be data-linked to the setpoint beam boundary. This may be carried out using a database or a look-up table, for example. If a similar configuration of topographic features is detected at a later point in time, the adapted setpoint beam boundary may be used immediately. As a result, the control quality is continually improved, the setpoint beam boundary being continuously adapted to instantaneous driving situations. Instantaneous conditions such as light conditions, load on the vehicle, roadway pavement, and/or driving dynamics of the vehicle are thus advantageously taken into account.

In another embodiment, the area of the roadway is selected from the measured values as a function of an area criterion.

In this embodiment, the measured values describe a major portion of the vehicle surroundings, so that the area may be selected within the measured values. In the case of an optical sensor, in particular a matrix camera, a portion of the image may thus be selected which is used as the area.

For this purpose, an open space recognition which disregards the obscured roadway areas is used. This ensures that only the roadway is evaluated, not, however, obscuring objects. In addition, it is conceivable to evaluate in particular the outer area of lanes. This has the advantage that wheels of the vehicle travel over these areas, so that in particular the outer areas bring about pitching motions of the vehicle. In this regard it is advantageous that the method may be carried out in a computationally efficient manner, and at the same time, particularly accurate results are achieved.

In another embodiment, an instantaneous headlight setting is stored at least for a period of time.

In this embodiment, at least one temporary storage of an instantaneous headlight setting takes place. This is advantageous in particular when only temporary changes in the topography of the roadway occur. This may be the case, for example, for a crosswalk marked by cobblestones, or for a bridge. The storage is then preferably used for taking the stored headlight setting as an initial condition subsequent to the roadway segment in question. A meaningful state of the headlight may thus be achieved very quickly.

It is understood that the features stated above and to be explained below may be used not only in the particular stated combination, but also in other combinations or alone without departing from the scope of the present invention.

Exemplary embodiments of the present invention are illustrated in the drawing and explained in greater detail in the following description.

DETAILED DESCRIPTION OF THE INVENTION

Figure 1:
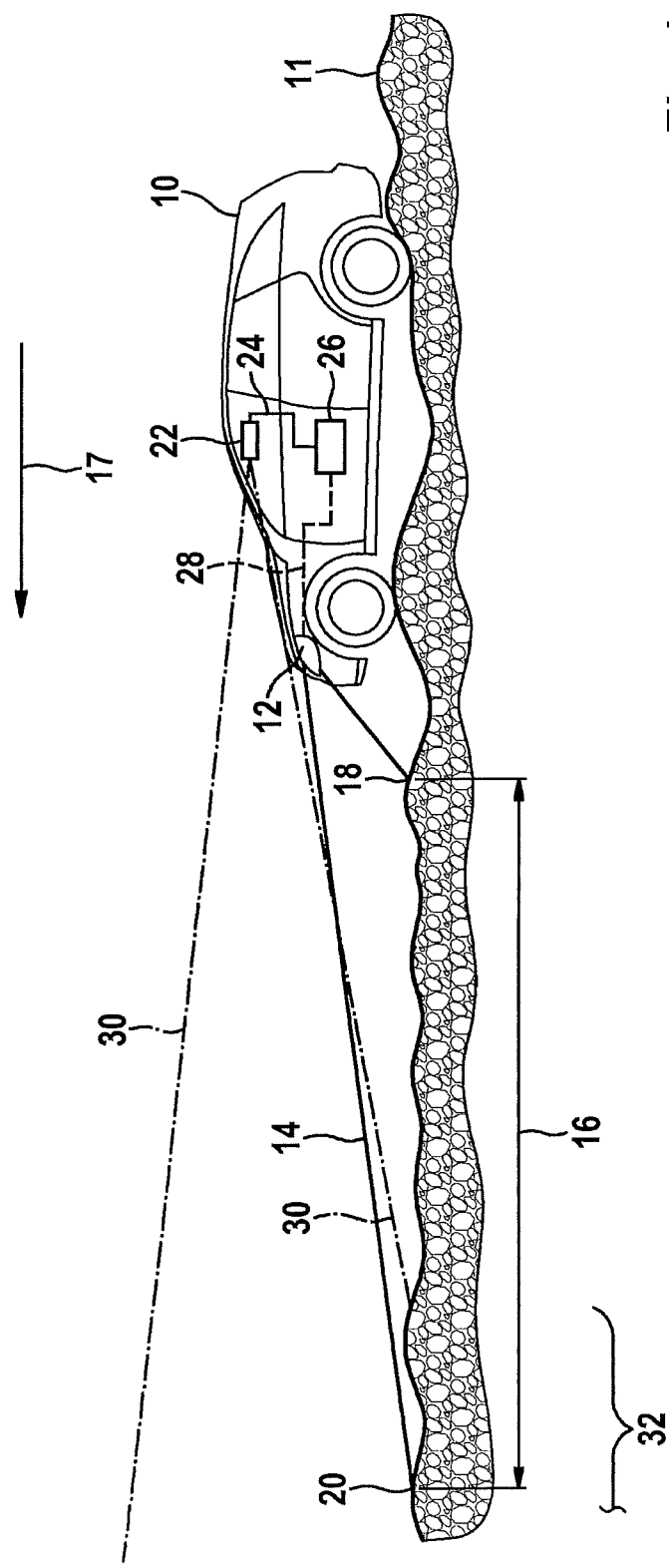
FIG. 1 shows a vehicle on a roadway.

FIG. 1 shows a motor vehicle 10 that is traveling on a roadway 11. Vehicle 10 includes a headlight 12 which emits a light cone 14 for illuminating roadway 11. This results in an illuminated area 16 on roadway 11 which is illuminated by light cone 14. The first transition from an unilluminated area into illuminated area 16, viewed in travel direction 17, defines a first headlight beam boundary 18. The second transition from illuminated area 16 into an unilluminated area in the travel direction defines a second headlight beam boundary 20. In the following discussion, the focus is on second headlight beam boundary 20, which is farthest from vehicle 10, viewed in the travel direction.

Vehicle 10 also includes a video camera 22. Video camera 22 is data-linked to an evaluation and control unit 26 via a data line 24. Evaluation and control unit 26 evaluates images of the surroundings of vehicle 10 which are recorded by video camera 22. A control signal is then provided via a control line 28 on the basis of this evaluation. Control line 28 connects evaluation and control unit 26 to headlight 12. Headlight beam boundary 20 may then be shifted toward or away from vehicle 10 as a function of the control signal. This takes place within the options made possible by the construction of headlight 12. The surroundings of vehicle 10 are only partially detected by camera 22. This takes place within a field of vision 30 determined by a camera optical system of video camera 22. Due to the design of video camera 22, this results in an area 32 of roadway 11 which is detected by video camera 22. Area 32 begins where field of vision 30 intersects roadway 11, viewed in travel direction 17.

As is apparent from FIG. 1, roadway 11 has topographic changes in travel direction 17. Due to the topographic changes, vehicle 10 undergoes pitching motions during travel; at the same time, headlight 12 undergoes a translatory motion in the direction of a vertical axis, and a rotatory motion about a transverse axis. The vertical axis and transverse axis are not illustrated here for reasons of clarity. Thus, light cone 14 is likewise acted on by a pitching motion, so that the distance of headlight beam boundary 20 from vehicle 10 undesirably changes during travel.

The advantage of the method is that, despite the pitching motions, the distance between headlight beam boundary 20 and vehicle 10 is adapted in such a way that a preferably large illuminated area 16 is generated, while at the same time, blinding of other road users is reduced or completely prevented.

Figure 2:
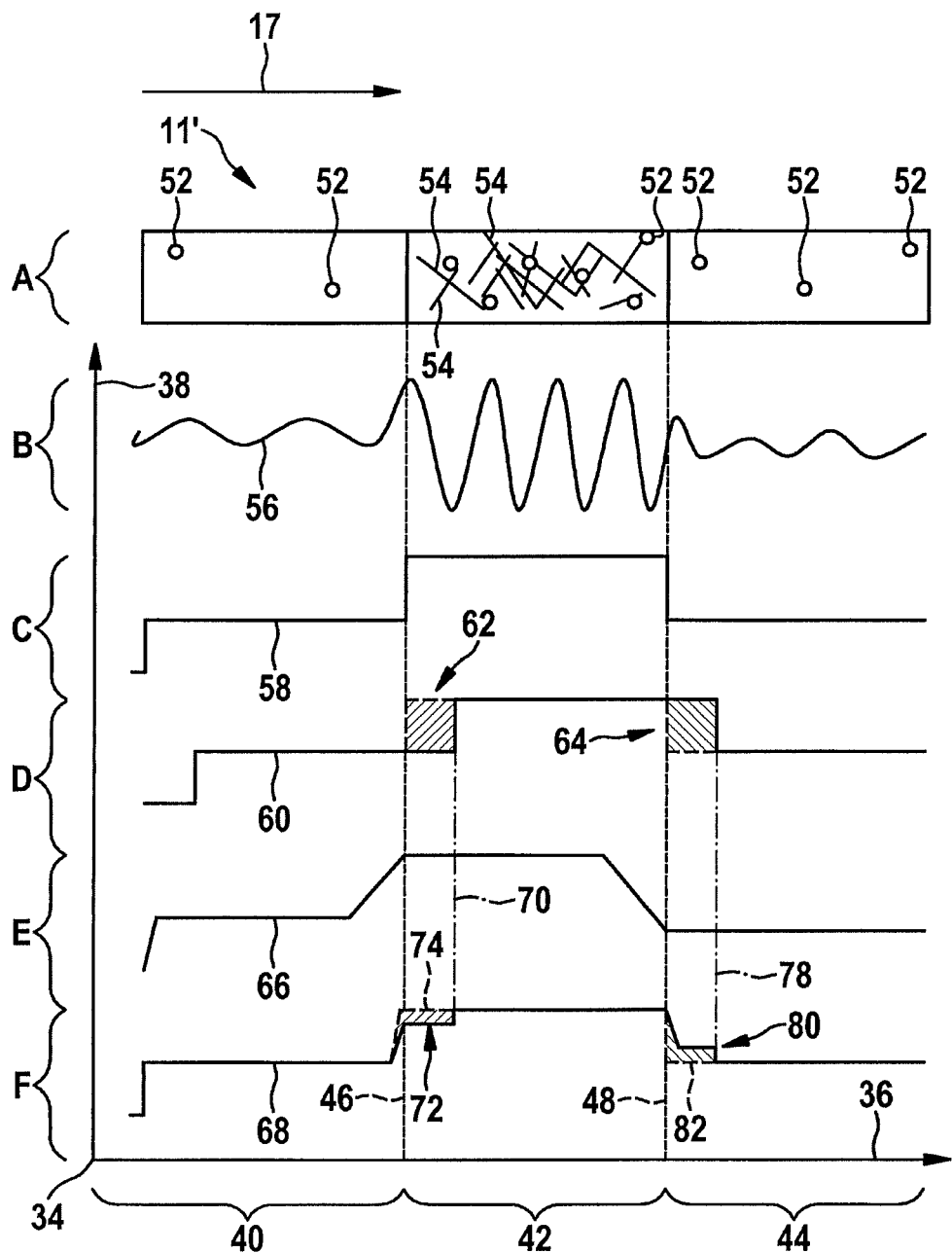
FIG. 2 shows a schematic illustration of relevant parameters of the method.

FIG. 2 shows a coordinate system 34 having an abscissa 36 and an ordinate 38. Abscissa 36 is associated with a path that is covered by vehicle 10. Ordinate 38 corresponds to an appropriate value of individual curves of horizontal sections B through F illustrated in coordinate system 34. Abscissa 36 is also divided into three vertical sections 40, 42, and 44 which describe different roadway states. The roadway states are described below with reference to section A. In addition, for the sake of clarity, individual sections A through F are connected by auxiliary lines 46 and 48, so that the effects of the roadway conditions on the curves of the different horizontal sections are easier to discern.

Roadway 11' is illustrated in a schematic top view in section A. Travel direction 17 runs in the direction of abscissa 36. A portion of roadway 11' is illustrated in section 40 which has a relatively high roadway quality, as represented here by two potholes 52 as an example. Roadway 11' has a very low roadway quality in section 42, as represented by multiple potholes 52 and damage to the roadway surface 54 as an example. For the sake of clarity, only a few potholes 52 and sites of damage 54 are provided with reference numerals. Examples of damage include ruts, cracks, and joints of repair sites. Roadway 11' once again has a relatively high roadway quality in section 44, as represented by three potholes 52 as an example.

Section B shows a curve 56 which describes a pitching motion of vehicle 10. This pitching motion results when vehicle 10 travels over roadway 11' in travel direction 17. In section 40 of curve 56 it is shown that only minor pitching motions of vehicle 10 take place on account of the high roadway quality. In section 42 it is apparent that the pitching motions of vehicle 10 increase in frequency as well as amplitude. This is caused by the large number of potholes 52 and sites of damage 54. Lastly, a significant decrease in the pitching motions of vehicle 10 compared to section 42 is apparent in section 44. This is due once again to the relatively high roadway quality in section 44. The overall result is that vehicle 10 initially undergoes relatively minor pitching motions, as the result of which the safety angle may be kept small. In other words, the less the pitch of the vehicle, the less "reserve" of the headlight beam boundary that is needed for road users. In contrast, a significantly larger safety angle is required in section 42, since very large pitching motions take place. The "reserve" must therefore be greatly increased.

This is illustrated as an example with the aid of a curve 58 in section C. It is apparent from curve 58 that the safety angle in section 40 is initially kept relatively small after an initiation phase. Thus, the headlight beam boundary is relatively far from vehicle 10, viewed in travel direction 17. This safety angle is significantly increased in section 42 due to the great pitching motions. Lastly, in section 44 the safety angle is reset to the value from section 40, since the pitching motions are reduced.

A curve 60 is illustrated in section D which describes the safety angle for the case that the safety angle is directly regulated as a function of the pitching motions of vehicle 10. A reaction time in section 42 and in section 44 is apparent here, in contrast to curve 58. This results in an area 62 at the beginning of section 42 in which there is a high risk of blinding other road users by vehicle 10. In addition, this results in an area 64 at the beginning of section 44 in which there is insufficient illumination for a driver of vehicle 10. An optimized illuminated area 16 does not result again until after the falling edge of the safety angle.

Another curve 66 is illustrated in section E which represents a pattern of a gradient density with regard to roadway 11. Initially, a ramp-shaped rising portion is apparent in section 40 in which the gradient density increases. This indicates the relatively poor roadway quality in section 42. In addition, there is a ramp-shaped drop in the gradient density at the end of section 42, which in turn indicates an improvement in the roadway quality. This signal, which is represented here by curve 66, forms one preferred exemplary embodiment for using topographic features for regulating the headlight beam boundary. Alternatively, it is conceivable to use an inverse signal of the gradient density.

The signal is ascertained as a function of roadway 11, using video camera 22. Due to the option for anticipatory, i.e., predictive, regulation, the effects of the reaction times which arise in section D may be counteracted. In other words, vehicle 10 may respond to the deteriorating roadway quality even before it travels over roadway 11 in the area in question. This results in a particularly rapid and very accurate regulation of the headlight beam boundary.

A curve 68 is shown in section F which describes a pattern of the safety angle, which is regulated as a function of curve 66. This once again results in setting of a relatively small safety angle in section 40. The safety angle is already increasing at the end of section 40 as a preventive measure, since the deterioration in the roadway quality has been detected. Initially, a slightly smaller increase is illustrated in section 42, which is compensated for by a combined regulation as a function of the pitching motion itself after the reaction time elapses at an auxiliary line 70. This results in an area 72 which is delimited by a further auxiliary line 74 for better understanding. Delimited area 72 represents the remaining risk of blinding the oncoming traffic. It is clear from a comparison of areas 72 and 62 that the risk of blinding of other road users has been considerably minimized due to the regulation. Similarly, via a further auxiliary line 78, an area 80 results which is delimited by an additional auxiliary line 82 in section 44. Here as well, it is clear from a comparison of area 80 with area 64 that a risk of an insufficiently illuminated area 16 has been reduced.

It is thus clear that the regulation of the safety angle, and thus of the headlight beam boundary, is improved within the time period between auxiliary line 46 and an auxiliary line 70, and between auxiliary line 48 and an auxiliary line 78. This advantageously results in increased safety for the driver of vehicle 10 and for the road users.

In one preferred specific embodiment, the value of the safety angle in the area of the reaction times is compared to the subsequent value of the safety angle, which has been determined as a function of the pitching motion. The regulation may thus be calibrated by storing the gradient densities and associating them with the corresponding safety angles. In other words, the regulation as a function of the topography is continuously calibrated with the aid of a second regulation of the headlight beam boundaries as a function of the pitch angle. Particularly accurate and dynamic regulation may be provided in this way.

The estimation of the new required safety angle with the aid of images from video camera 22 has a great influence on the computing power of evaluation and control unit 26. The overall system may thus be designed differently by changing control parameters. On the one hand, it is conceivable to provide the regulation with an offensive design. This results in a greater risk of blinding for other road users, and at the same time, a larger illuminated area 16 for the driver of vehicle 10. On the other hand, it is conceivable to provide the regulation with a defensive design. This results in a low risk of blinding for other road users, and at the same time, a small illuminated area 16 for the driver of vehicle 10. In the ideal case, the change in the safety angle is optimally determined from the roadway quality, so that the safety angle which is actually set corresponds to an ideal safety angle.

Figure 3:
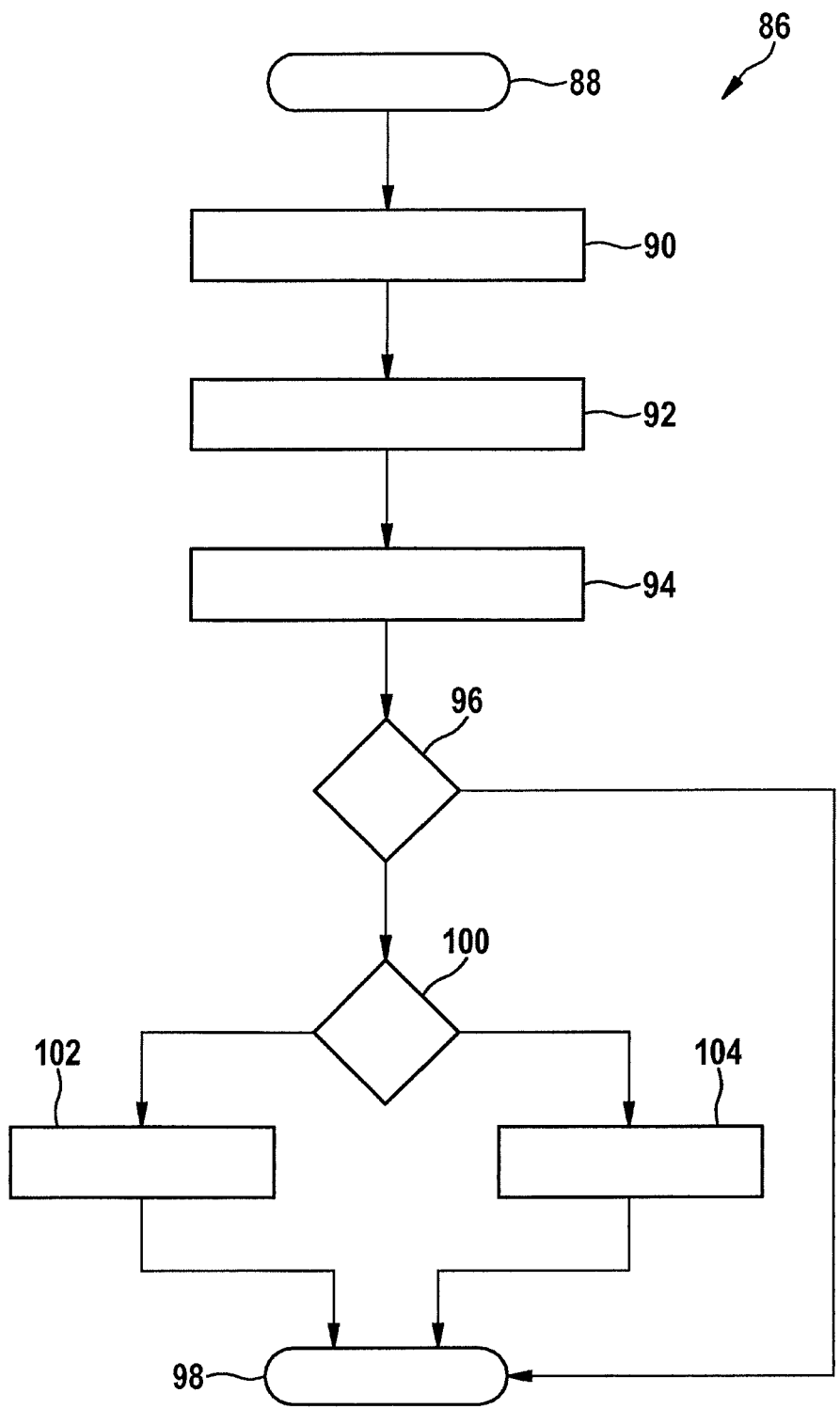
FIG. 3 shows a flow chart of a first specific embodiment of the method.

FIG. 3 shows a flow chart 86 of one preferred exemplary embodiment of the method.

The method begins in a starting step 88.

A headlight beam boundary is computed from a preceding roadway segment in a first step 90. Alternatively, a safety angle may be computed instead of the headlight beam boundary.

A topography of the roadway ahead of the vehicle is analyzed in a further step 92. This allows conclusions concerning homogeneity and changes in topography of the roadway, and may take place, for example, by evaluating topographic features, in particular gradients and gradient density.

The topography and/or the topographic features is/are buffered in a further step 94.

The topography in the area ahead, which has been buffered in step 94, is compared to a topography of a preceding buffering in a further step 96. If the topography and/or topographic features does/do not differ or does/do not differ significantly, this indicates that the roadway quality has remained the same. The method thus proceeds directly to final step 98. A change in the headlight beam boundary is not necessary in this case. If the topographies and/or topographic features differ significantly, the method proceeds to a further step 100.

A determination is made in step 100 as to whether the roadway quality ahead is better or worse than the instantaneous roadway quality. This may take place by qualitatively comparing topographic features and/or the topographies themselves.

If the roadway quality is worse, the headlight beam boundary is shifted away from the vehicle and/or the safety angle is thus decreased in a further step 102.

If the roadway quality is better in step 100, the headlight beam boundary is shifted toward the vehicle and/or the safety angle is increased in a further step 104.

The exemplary embodiments which are described, and shown in the figures, have been selected only as examples. Different exemplary embodiments may be combined with one another, either completely or with respect to individual features. In addition, one exemplary embodiment may be supplemented by features of another exemplary embodiment. Furthermore, method steps according to the present invention may be repeated, and carried out in a sequence different from that described.

What is claimed is:

1. A method for adapting a headlight beam boundary of a light cone of at least one headlight of a vehicle, the method comprising:
   detecting, by a sensor, at least a first area of a roadway that is situated ahead of the vehicle in a travel direction of the vehicle;
   determining, by processing circuitry, a topography of the first area of the roadway;
   determining, by the processing circuitry, a difference between the topography of the first area of the roadway and a topography of a second area of the roadway on which the vehicle is currently situated; and
   providing, by the processing circuitry, a headlight control signal based on which the headlight beam boundary is changed prior to the vehicle reaching the first area of the roadway and based on the determined difference in topography between the first and second areas.

2. The method as recited in claim 1, wherein the headlight control signal is provided as a function of how quickly the vehicle is expected to reach the first area, determined based on a speed of the vehicle.

3. The method as recited in claim 2, wherein the first area of the roadway is detected using an optical sensor, the topography of the first area being determined as a function of one or more measured values of the optical sensor.

4. The method as recited in claim 3, wherein:
   a matrix camera which generates at least one image as the one or more measured values is used as the optical sensor;
   at least one topographic feature is determined as a function of the at least one image; and
   the topography of the first area is determined as a function of the at least one topographic feature.

5. The method as recited in claim 4, wherein at least one gradient in the at least one image is determined as the topographic feature.

6. The method as recited in claim 4, further comprising:
   storing first topographic features which have been determined at a selected geographical location;

determining a pitching motion of the vehicle at the selected geographical location;

ascertaining a setpoint beam boundary as a function of the pitching motion; and associating the setpoint beam boundary with the first topographic features.

7. The method as recited in claim 3, wherein the first area of the roadway is selected from the measured values of the optical sensor as a function of an area criterion.

8. The method as recited in claim 4, wherein an instantaneous headlight setting is stored at least for a predefined period of time.

9. A system for adapting a headlight beam boundary of a light cone of at least one headlight of a vehicle, comprising:

a sensor configured to detect a first area of a roadway that is situated ahead of the vehicle in a travel direction of the vehicle;

a control unit including a processor configured to perform the following:

determining a topography of the first area of a roadway;

determining a difference between the topography of the first area of the roadway and a topography of a second area of the roadway on which the vehicle is currently situated; and providing a headlight control signal based on which the headlight beam boundary is changed prior to the vehicle reaching the first area of the roadway and based on determined difference in topography between the first and second areas.

10. A non-transitory, computer-readable data storage medium storing a computer program having program codes which, when executed on a computer, perform a method for adapting a headlight beam boundary of a light cone of at least one headlight of a vehicle, the method comprising:

obtaining from a sensor a signal representing a detected first area of a roadway that is situated ahead of the vehicle in a travel direction of the vehicle;

determining a topography of the first area of the roadway;

determining a difference between the topography of the first area of the roadway and a topography of a second area of the roadway on which the vehicle is currently situated; and providing a headlight control signal based on which the headlight beam boundary is changed prior to the vehicle reaching the first area of the roadway and based on the determined difference in topography between the first and second areas.

11. The method as recited in claim 1, wherein the headlight control signal is provided by execution of an algorithm according to which, if the determined difference is that the topography of the first area is more uneven than the topography of the second area, then the headlight control signal controls the at least one headlight to shift the headlight beam boundary closer to the vehicle.

12. The method as recited in claim 11, wherein, according to the algorithm, if the determined difference is that the topography of the second area is more uneven than the topography of the first area, then the headlight control signal controls the at least one headlight to shift the headlight beam boundary further away from the vehicle.

* * * * *